United States Patent
Chen

(10) Patent No.: US 10,461,309 B2
(45) Date of Patent: Oct. 29, 2019

(54) METHOD FOR MANUFACTURING ELECTRODE

(71) Applicant: ASUSTeK COMPUTER INC., Taipei (TW)

(72) Inventor: Yu-Kuang Chen, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 126 days.

(21) Appl. No.: 15/441,208

(22) Filed: Feb. 23, 2017

(65) Prior Publication Data

US 2017/0256779 A1    Sep. 7, 2017

(30) Foreign Application Priority Data

Mar. 2, 2016 (TW) .............................. 105106312 A

(51) Int. Cl.
*H01M 4/04* (2006.01)
*H01M 4/36* (2006.01)
*H01M 4/139* (2010.01)

(52) U.S. Cl.
CPC ....... *H01M 4/0404* (2013.01); *H01M 4/0435* (2013.01); *H01M 4/0471* (2013.01); *H01M 4/139* (2013.01); *H01M 4/366* (2013.01)

(58) Field of Classification Search
CPC .................................................. H01M 4/0404
See application file for complete search history.

(56) References Cited

U.S. PATENT DOCUMENTS

| 2006/0063071 | A1 | 3/2006 | Yasuda et al. | |
| 2009/0029251 | A1* | 1/2009 | Baba | H01M 2/1016 |
| | | | | 429/209 |
| 2010/0203308 | A1 | 8/2010 | Mennig et al. | |
| 2011/0068001 | A1* | 3/2011 | Affinito | H01M 4/13 |
| | | | | 204/242 |
| 2014/0308576 | A1* | 10/2014 | Gaben | C25D 13/02 |
| | | | | 429/185 |
| 2017/0110760 | A1* | 4/2017 | Hatta | H01M 10/056 |
| 2018/0048040 | A1* | 2/2018 | Liu | H01G 11/08 |

FOREIGN PATENT DOCUMENTS

| CN | 103718346 | 4/2014 |
| CN | 103769086 | 5/2014 |
| JP | 2005353384 | 12/2005 |
| TW | 200531331 | 9/2005 |
| TW | 200606282 | 2/2006 |

* cited by examiner

*Primary Examiner* — Austin Murata
(74) *Attorney, Agent, or Firm* — JCIPRNET

(57) ABSTRACT

A method for manufacturing an electrode is provided. A composite including a carrier layer and a collector layer disposed thereon is provided. The collector layer has a first surface and an opposite second surface, and the first surface of the collector layer faces to the carrier layer. A first coating process is performed to coat first electrode material on the second surface of the collector layer. A first curing process is performed to dry the first electrode material. The carrier layer is removed after the first electrode material is dried to expose the first surface of the collector layer. A second coating process is performed to coat a second electrode material on the first surface of the collector layer. A material of the second electrode material is same with that of the first electrode material. A second curing process is performed to dry the second electrode material.

8 Claims, 6 Drawing Sheets

METHOD FOR MANUFACTURING ELECTRODE

CROSS-REFERENCE TO RELATED APPLICATION

This application claims the priority benefit of TW application serial No. 105106312, filed on Mar. 2, 2016. The entirety of the above-mentioned patent application is hereby incorporated by reference herein and made a part of specification.

BACKGROUND OF THE INVENTION

Field of the Invention

The invention relates to a method for manufacturing an electric component and, more particularly, to a method for manufacturing an electrode.

Description of the Related Art

Generally, a volume energy density of a battery is increased by reducing the thickness of an anode/cathode collector layer. However, when the collector layer is thin, the tensile strength is week, and then the collector layer is easily cracked under the same conditions in the slurry coating process. Moreover, the thin collector layer may not meet the requirement for the process equipment.

BRIEF SUMMARY OF THE INVENTION

According to one aspect of the disclosure, a method for manufacturing an electrode, comprises: providing a composite material including a carrier layer and a collector layer disposed on the carrier layer, wherein the collector layer includes a first surface and a second surface opposite to each other, and the first surface of the collector layer faces to the carrier layer; performing a first coating process to coat a first electrode material on the second surface of the collector layer; performing a first curing process to dry the first electrode material; removing the carrier layer to expose the first surface of the collector layer after the first electrode material is dried; performing a second coating process to coat a second electrode material on the first surface of the collector layer, wherein a material of the second electrode material is same with the material of the first electrode material; and performing a second curing process to dry the second electrode material.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

Figure 1A:
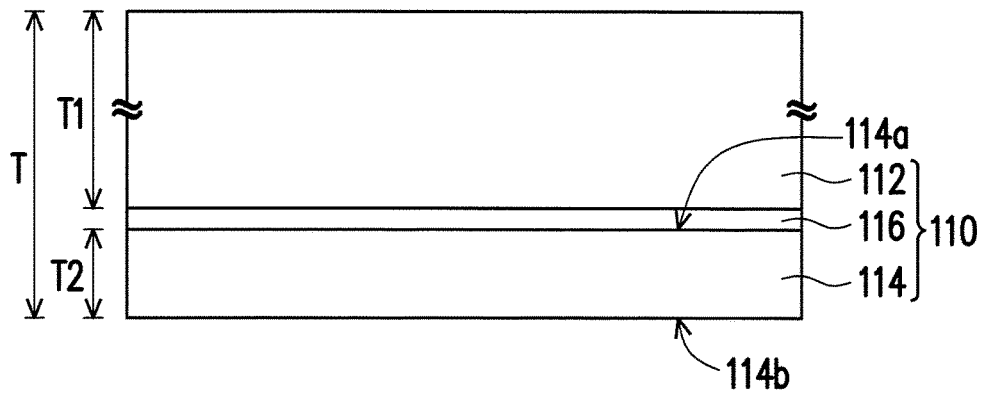
FIG. 1A to FIG. 1I are cross-section diagrams showing a method for manufacturing an electrode in a first embodiment.

FIG. 1A to FIG. 1I are cross-section diagrams showing a method for manufacturing an electrode in a first embodiment. Please refer to FIG. 1A, in the embodiment, a composite material 110 is provided. The composite material 110 includes a carrier layer 112 and a collector layer 114 disposed on the carrier layer 112. The collector layer 114 includes a first surface 114a and a second surface 114b opposite to each other, and the first surface 114a of the collector layer 114 faces to the carrier layer 112.

In detail, in the embodiment, a thickness T1 of the carrier layer 112 is larger than a thickness T2 of the collector layer 114. In an embodiment, the thickness T1 of the carrier layer 112 is 6 micrometer ($\mu$m) to 200 $\mu$m, and the thickness T2 of the collector layer 114 is 1 $\mu$m to 6 $\mu$m, which are not limited herein. In the embodiment, the composite material 110 further includes a release layer 116 disposed between the carrier layer 112 and the collector layer 114 to facilitate release the carrier layer 112 and the collector layer 114 thereafter. In an embodiment, the material of the carrier layer 112 is a metal foil (such as copper, aluminum, stainless steel) or a polymer (such as polyimides (PI), polymethyl methacrylate (PMMA), polypropylene (PP), polycarbonate (PC), polyethylene (PE), polyethylene terephthalate (PET), polyvinyl chloride (PVC)) or a combination thereof, which is not limited herein. The material of the collector layer 114 is a composite metal foil, such as one or a combination selected from the group consisting: copper foil, aluminum foil, stainless steel foil. The release layer 116 is an adhesive for attaching the carrier layer 112 and the collector layer 114 and the material of the release layer 116 is polypropylene and/or polyethylene, which is not limited herein.

Figure 1B:
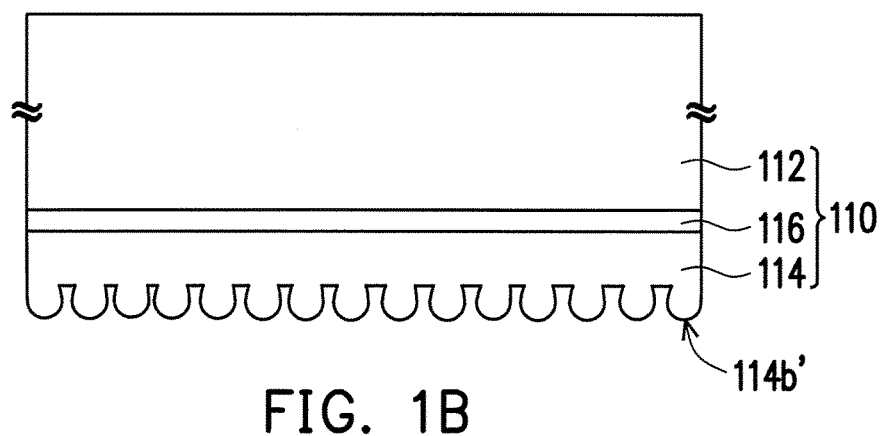

Please refer to FIG. 1B, a first roughening process is performed to roughen the second surface 114b of the collector layer 114 to form a second surface 114b', for increasing a contact area between the electrode material and the collector layer 114. The first roughening process is an optional step, which can be selectively to be performed. In an embodiment, a ten-point average roughness (Rz) of the second surface 114b' is 0.1 $\mu$m to 4 $\mu$m, and the first roughening process is a chemical roughening process or a physical roughening process. For example, in the chemical roughening process, the second surface 114b of the collector layer 114 is roughened via a chemical agent; in the physical roughening process, the second surface 114b of the collector layer 114 is grinded via an abrasive, or the plasma bombardment or the sanding blast is performed to the second surface 114b of the collector layer 114.

Figure 1C:
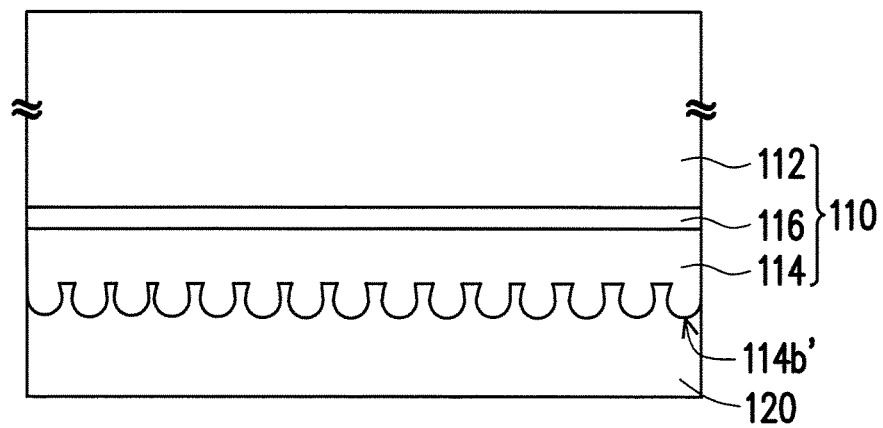

Please refer to FIG. 1C, a first coating process is performed, a first electrode material 120 is coated on the second surface 114b' of the collector layer 114. In an embodiment, the first electrode material 120 is an anode material or a cathode material, the anode material is one or a combination selected from the group consisting: lithium cobalt oxide, lithium cobalt nickel manganese oxide, lithium nickel and titanium oxide, lithium manganese oxide, lithium iron phosphate, and lithium nickel manganese oxide; the cathode material is one or a combination selected from the group consisting: graphite, silicon carbide, silicon oxide, and tin oxide, which is not limited herein.

Figure 1D:
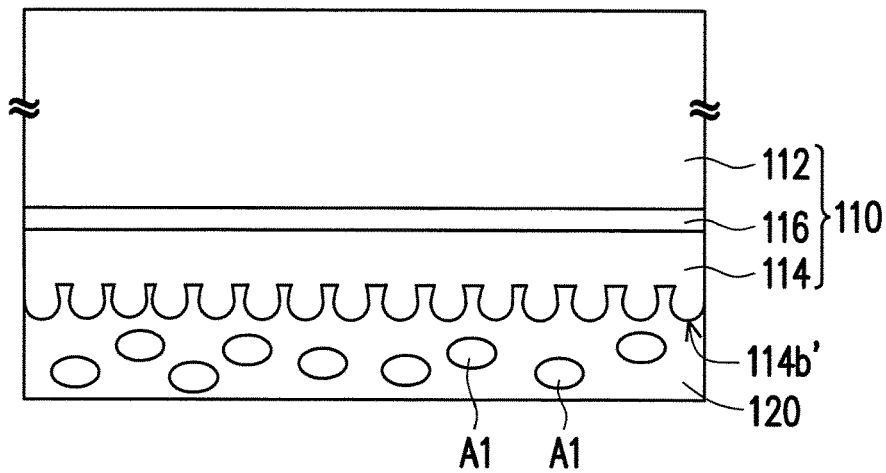

Please refer to FIG. 1D, a first curing process is performed to dry the first electrode material 120. In the embodiment, the time for the first curing process is 30 min to 120 min, and the temperature for the first curing process is 90° C. to 150° C. Since the first electrode material 120 is in a fluid form, at least a first air gap A1 is generated in the first electrode material 120 when the first curing process is performed.

Figure 1E:
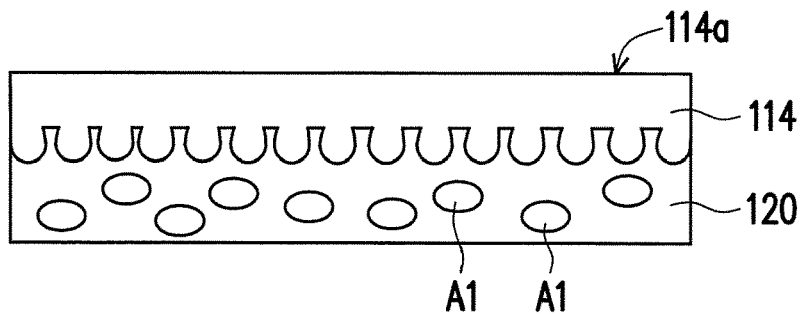

Please refer to FIG. 1D and FIG. 1E, the carrier layer 112 is removed to expose the first surface 114a of the collector layer 114 after the first electrode material 120 is dried. In an embodiment, the carrier layer 112 and the release layer 116 thereon are removed by removing of the release layer 116 which is located between the carrier layer 112 and the collector layer 114.

Figure 1F:
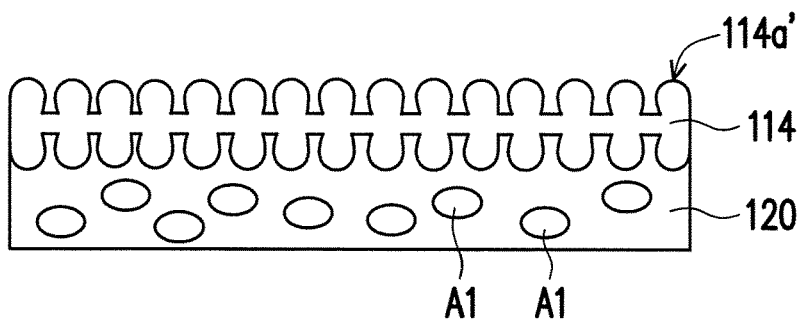

Please refer to FIG. 1E and FIG. 1F, a second roughening process is performed to roughen the first surface 114a of the collector layer 114 to form a first surface 114a', for increasing a contact area between the electrode material and the collector layer 114. The second roughening process is an optional step, which is selectively to be performed. In an embodiment, a ten-point average roughness (Rz) of the first surface 114a' is 0.1 μm to 4 μm, and the second roughening process is a chemical roughening process or a physical roughening process. For example, in the chemical roughening process, the first surface 114a of the collector layer 114 is roughened via a chemical agent; in the physical roughening process, the first surface 114a of the collector layer 114 is grinded via an abrasive, or the plasma bombardment or the sanding blast is performed to the first surface 114a of the collector layer 114.

Figure 1G:
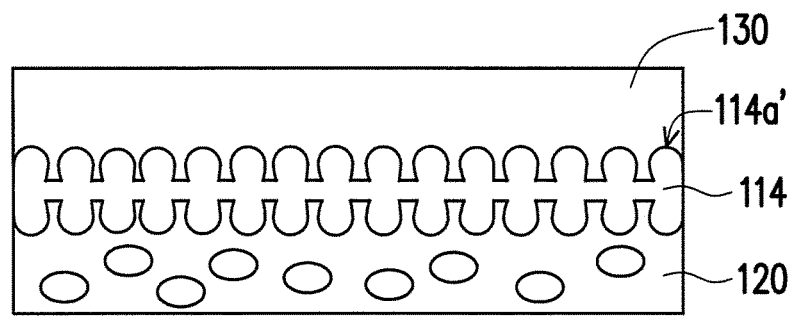

Please refer to FIG. 1G, a second coating process is performed, and then a second electrode material 130 is coated on the first surface 114a' of the collector layer 114. The material of the second electrode material 130 is same with that of the first electrode material 120. In an embodiment, the second electrode material 130 is an anode material or a cathode material, the anode material is one or a combination selected from the group consisting: lithium cobalt oxide, lithium cobalt nickel manganese oxide, lithium nickel and titanium oxide, lithium manganese oxide, lithium iron phosphate, and lithium nickel manganese oxide; the cathode material is one or a combination selected from the group consisting: graphite, silicon carbide, silicon oxide, and tin oxide, which is not limited herein.

Figure 1H:
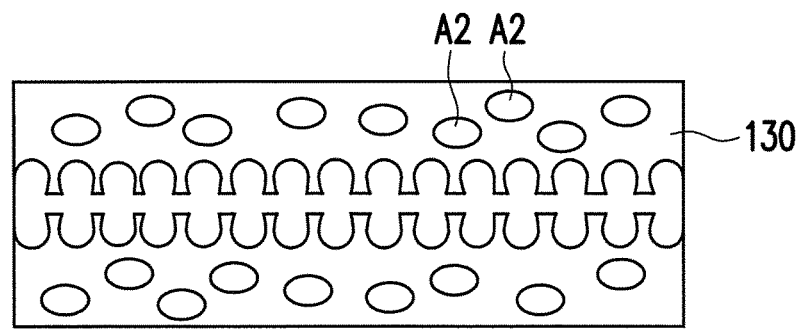

Please refer to FIG. 1H, a second curing process is performed to dry the second electrode material 130. The time for the second curing process is 30 min to 120 min, and the temperature for the second curing process is 90° C. to 150° C. Since the second electrode material 130 is in a fluid form, at least a second air gap A2 is formed in the second electrode material 130 when the second curing process is performed.

Figure 1I:
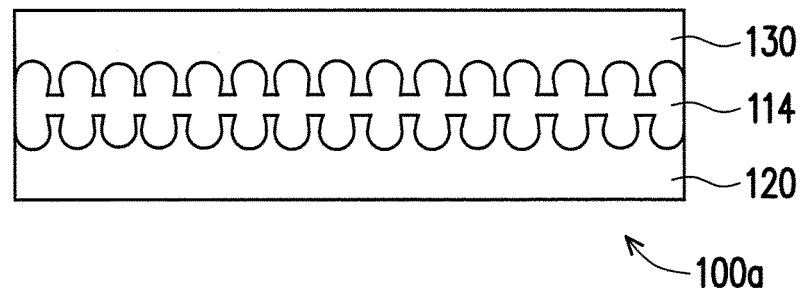

Please refer to FIG. 1H and FIG. 1I, the dried first electrode material 120 and the dried second electrode material 130 are rolled to squeeze out the first air gap A1 and the second air gap A2, and then the conducting efficiency of the electrode 100a is improved. Then, the electrode 100a is formed.

In the embodiment, the carrier layer 112 is used as a supporting layer for the collector layer 114 in the manufacture of the electrode 100a. Therefore, the collector layer 114 has a good tensile strength when the first coating process and the first curing process are performed. In addition, after the first electrode material 120 is dried, the carrier layer 112 is removed. Thus, the formed electrode 100a has no the carrier layer 112, and then the thickness of the electrode 100a becomes thinner. Furthermore, since the electrode 100a is thinner, the battery (not shown) formed by stacking of the electrodes 100a has a higher volume energy density, and the service life is increased by 5%~30%. In addition, in the embodiment, a roughening process is performed to the first surface 114a and the second surface 114b of the collector layer 114, the roughness of the first surface 114a' and the second surface 114b' is improved, and thus the contact area between the first electrode material 120, the second electrode material 130 with the collector layer 114 is increased, and the charging/discharging power value of the battery is improved.

Figure 2A:
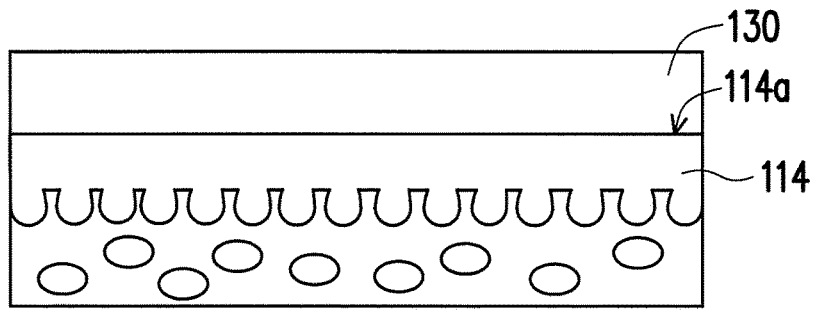
FIG. 2A to FIG. 2C are cross-section diagrams showing partial steps of a method for manufacturing an electrode in a second embodiment.
Figure 2B:
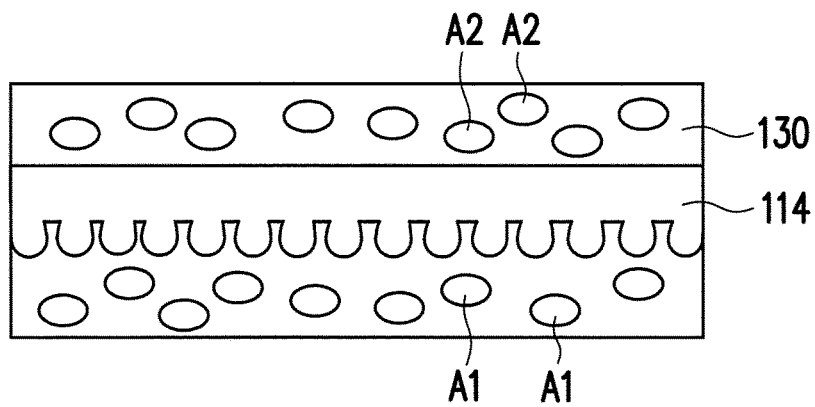
Figure 2C:
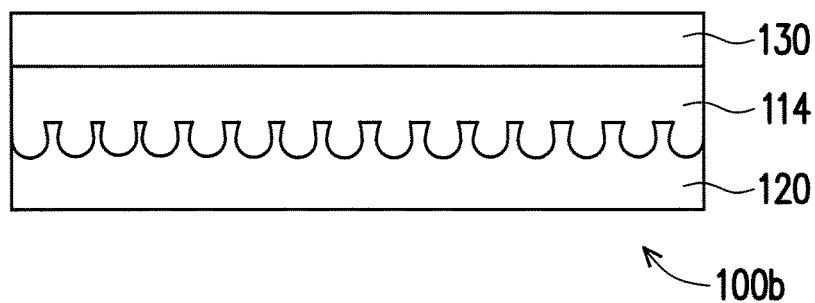

FIG. 2A to FIG. 2C are cross-section diagrams showing partial steps of a method for manufacturing an electrode in a second embodiment. Please refer to FIG. 2C, in the embodiment, the method for manufacturing the electrode 100b is similar to the method for manufacturing the electrode 100a in FIG. 1A to FIG. 1I, and the difference between the two embodiments is the steps after the step of removing the carrier layer 112 to expose the first surface 114a of the collector layer 114 in FIG. 1E, and the same steps are not described again.

Please refer to FIG. 2A, a second coating process is performed to coat a second electrode material 130 on the first surface 114a of the collector layer 114. In the embodiment, after the step in FIG. 1E, the roughening process is not performed to the first surface 114a of the collector layer 114.

Please refer to FIG. 2B, a second curing process is performed to dry the second electrode material 130. The time for the second curing process is 30 min to 120 min, and the temperature for the second curing process is 90° C. to 150° C. Since the second electrode material 130 is in a fluid form, at least a second air gap A2 is generated in the second electrode material 130 when the second curing process is performed.

Please refer to FIG. 2B and FIG. 2C, the dried first electrode material 120 and the dried second electrode material 130 are rolled to squeeze out the first air gap A1 and the second air gap A2, and then the conducting efficiency of the electrode 100b is improved. Then, the electrode 100b is formed.

Figure 3A:
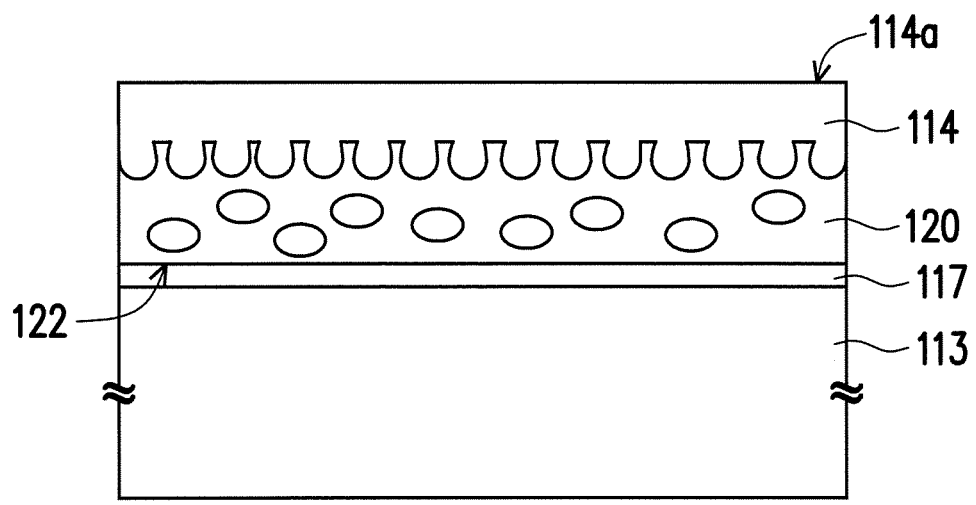
FIG. 3A to FIG. 3E are cross-section diagrams showing partial steps of a method for manufacturing an electrode in a third embodiment.

FIG. 3A to FIG. 3E are cross-section diagrams showing partial steps of a method for manufacturing an electrode in a third embodiment. Please refer to FIG. 3A, in the embodiment, the method for manufacturing the electrode 100c is similar to the method for manufacturing the electrode 100b, and the difference therebetween is that: after the step in FIG. 1E (that is the step of removing the carrier layer 112 to expose the first surface 114a of the collector layer 114), the carrier layer 113 and the release layer 117 are provided to increase the tensile strength. The carrier layer 113 is configured on the surface 122 of the dried first electrode material 120 far away from the collector layer 114 via the release layer 117. The carrier layer 113 is used as a supporting layer in the subsequent of the second coating process, and the carrier layer 113 can also increase the tensile strength of the collector layer 114 and the first electrode material 120. The release layer 117 can be regard as the adhesive between the carrier layer 113 and the first electrode material 120. The material of the carrier layer 113 is a metal foil (such as copper, aluminum, stainless steel) or a polymer (such as PI, PMMA, PP, PC, PE, PET, PVC) or a combination thereof, which is not limited herein. The thickness of the carrier layer 113 is 6 μm to 200 μm, which is not limited herein. The step in FIG. 3A is an optional step, which can be selectively to be performed.

Figure 3B:
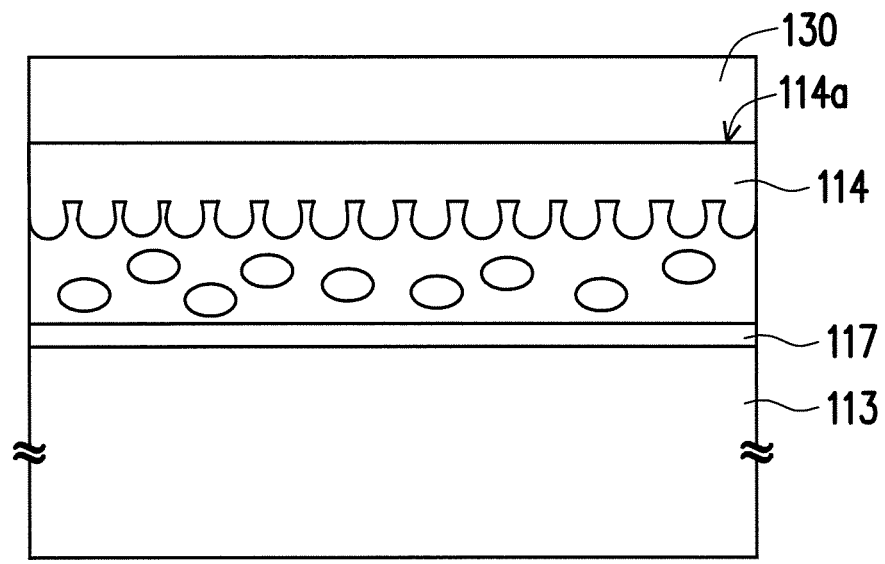

Please refer to FIG. 3B, a second coating process is performed, and then a second electrode material 130 is coated on the first surface 114a of the collector layer 114. In the embodiment, the roughening process is not performed to the first surface 114a of the collector layer 114.

Figure 3C:
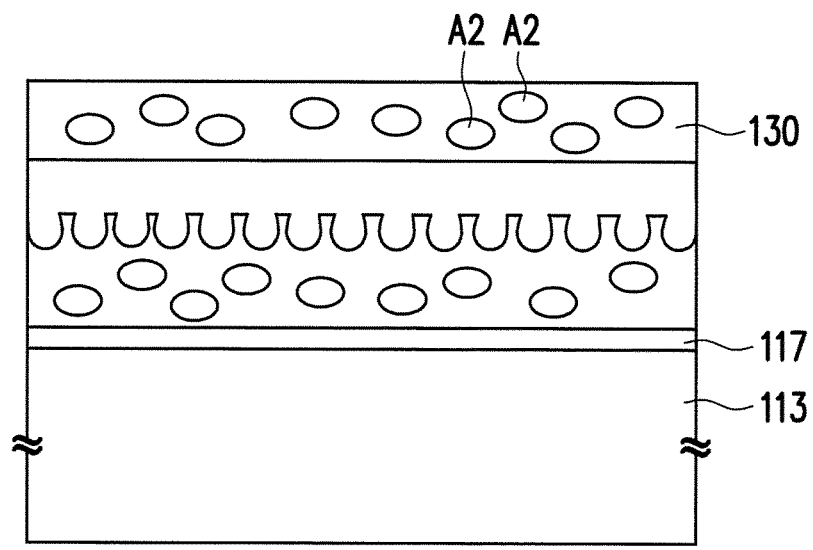

Please refer to FIG. 3C, a second curing process is performed to dry the second electrode material 130. The time for the second curing process is 30 min to 120 min, and the temperature for the second curing process is 90° C. to 150° C. Since the second electrode material 130 is in a fluid form, at least a second air gap A2 is generated in the second electrode material 130 when the second curing process is performed.

Figure 3D:
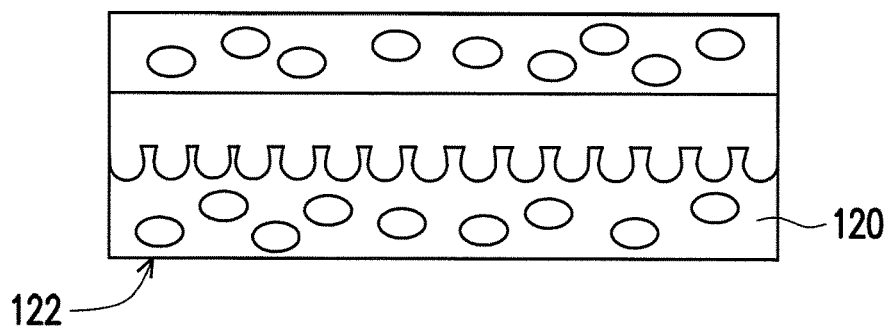

Please refer to FIG. 3C and FIG. 3D, the carrier layer 113 and the release layer 117 are removed to expose the surface 122 of the first electrode material 120. The release layer 117 between the carrier layer 113 and the first electrode material 120 is peeled to remove the release layer 117 and the carrier layer 113.

Figure 3E:
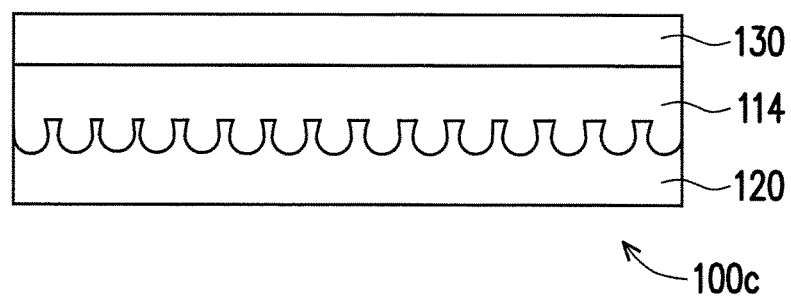

Please refer to FIG. 3E, the dried first electrode material 120 and the dried second electrode material 130 are rolled to squeeze out the first air gap A1 and the second air gap A2 to increase the conducting efficiency of the electrode 100c. Then, the electrode 100c is formed.

In sum, in the method for manufacturing the electrode in embodiments, the collector layer is disposed on the carrier layer, and then the carrier layer is regarded as a supporting layer for the collector layer, so as to improve the tensile strength of the collector layer. After the first electrode material is dried, the carrier layer is removed. To increase the tensile strength, the carrier layer is attached to serve as a supporting layer for the second coating process before the second electrode material is coated. After the second electrode material is dried, the carrier layer is removed, and then the formed electrode has no the carrier layer, thus, the electrode is thinner and the battery formed by stacking the electrode 100a has a higher volume energy density.

Although the invention has been disclosed with reference to certain preferred embodiments thereof, the disclosure is not for limiting the scope. Persons having ordinary skill in the art may make various modifications and changes without departing from the scope of the invention. Therefore, the scope of the appended claims should not be limited to the description of the preferred embodiments described above.

What is claimed is:

1. A method for manufacturing an electrode, comprising:
   providing a composite material including a carrier layer and a collector layer disposed on the carrier layer, wherein the collector layer includes a first surface and a second surface opposite to each other, and the first surface of the collector layer faces to the carrier layer;
   performing a first coating process to coat a first electrode material on the second surface of the collector layer;
   performing a first curing process to dry the first electrode material;
   removing the carrier layer to expose the first surface of the collector layer after the first electrode material is dried;
   performing a second coating process to coat a second electrode material on the first surface of the collector layer, wherein a material of the second electrode material is same with the material of the first electrode material;
   performing a second curing process to dry the second electrode material;
   providing another carrier layer on a surface of the dried first electrode material far away from the collector layer after the carrier layer is removed and before the second coating process is performed, wherein the another carrier layer is configured on the surface of the collector layer via a release layer; and
   removing the another carrier layer and the release layer to expose the surface of the first electrode material after the second electrode material is dried.

2. The method for manufacturing the electrode according to claim 1, further comprising:
   performing a first roughening process to roughen the second surface of the collector layer after the composite material is provided and before the first coating process is performed.

3. The method for manufacturing the electrode according to claim 2, further comprising:
   performing a second roughening process to roughen the first surface of the collector layer after the carrier layer is removed and before the second coating process is performed.

4. The method for manufacturing the electrode according to claim 1, wherein a thickness of the carrier layer is 6 μm to 200 μm.

5. The method for manufacturing the electrode according to claim 1, wherein the first electrode material is an anode material or a cathode material.

6. The method for manufacturing the electrode according to claim 1, wherein the composite material further includes a release layer configured between the carrier layer and the collector layer.

7. The method for manufacturing the electrode according to claim 6, wherein a material of the release layer is polypropylene and/or polyethylene.

8. The method for manufacturing the electrode according to claim 1, further comprising:
   when the first curing process is performed, a first air gap is generated in the first electrode material;
   when the second curing process is performed, a second air gap is generated in the second electrode material; and
   rolling the dried first electrode material and the dried second electrode material to squeeze out the first air gap and the second air gap.

* * * * *